Patented Nov. 19, 1929

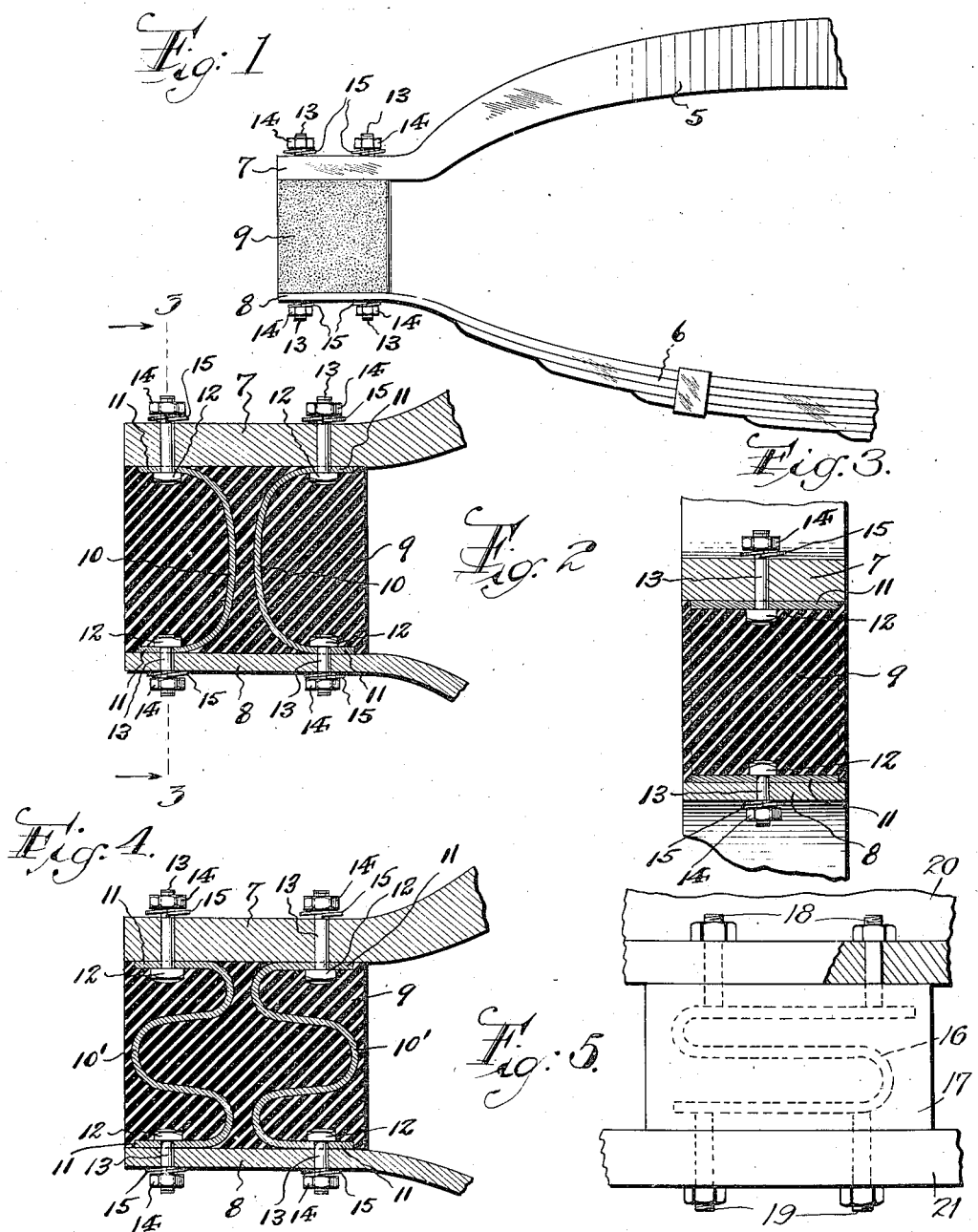

1,735,899

UNITED STATES PATENT OFFICE

RALPH L. HENRY, OF DETROIT, MICHIGAN, ASSIGNOR TO ALBERT C. HENRY, OF INWOOD, NEW YORK

RESILIENT COUPLING CONNECTION FOR VEHICLE SPRINGS

Application filed October 29, 1926. Serial No. 144,926.

This invention relates to an improved construction of resilient coupling connection between the end of a vehicle leaf-spring and the vehicle frame, the same being designed to replace the pivoted shackle couplings usually employed between such parts.

This invention has for its principal object to provide a resilient coupling connection for the purposes above mentioned which will be sensitively yieldable to the longitudinal displacements of the vehicle spring, during the flection of the same under operating conditions, and yet which is so devised that tendency to undesirable side sway or undue lateral play is effectually resisted. To this end the resilient coupling connection comprises a body of resilient material, such as soft rubber, within which is imbedded, to extend therethrough from top to bottom thereof, curved metallic flat spring elements provided with means for positively securing their ends in mechanically fastened relation respectively to the spring end and to the vehicle frame; said metallic spring elements serving to retain the resilient body member in operative position, and in conjunction therewith being so disposed as to flex readily under longitudinal stresses transmitted through the resilient body, while reenforcing and bracing the latter to resist lateral stresses.

Other objects of this invention, not at this time more particularly enumerated, will be clearly understood from the following detailed description of the same.

The invention is clearly illustrated in the accompanying drawings, in which:—

Figure 1 is a side elevation of the novel resilient coupling connection operatively connected between a leaf-spring end and a vehicle frame, such for example as a suitable part of an automobile chassis; Figure 2 is a longitudinal section through said connection, spring and frame; and Figure 3 is a transverse section, taken on line 3—3 in said Figure 2.

Figure 4 is a longitudinal section, showing the resilient body of the connection provided with a modified form of curved metallic flat spring elements.

Figure 5 is an elevation view in part section showing an alternate embodiment of the invention.

Similar characters of reference are employed in all of the hereinabove described views, to indicate corresponding parts.

Referring to the drawings, the reference character 5 indicates a part of the vehicle frame, such, for example, as the chassis frame of an automobile to which is to be coupled a leaf-spring 6. In place of the usual knuckles, with which such parts are ordinarily provided to receive a pivotally connected shackle link commonly employed to interconnect the same together, the frame is provided with a horizontal extension or tongue 7, and the main leaf of the spring is provided, at its free end, with a horizontal extension or bearing plate 8 for parallel alignment with said frame extension or tongue 7.

The novel resilient coupling connection, embodying the principles of the present invention, comprises a rectangular block or body member 9 of suitable height, length and width. Imbedded in the said body member 9, so as to extend from the upper part to the lower part thereof, and adjacent to each end portion of the same, are transversely disposed bowed metallic spring members 10, the respective terminal portions 11 of which lie respectively parallel to the top and bottom planes of the body member 9, and preferably although not necessarily flush with the top and bottom exterior surfaces of the latter. The reference character 12 indicates the heads of fastening bolts 13. The heads 12 of said bolts 13 are engaged against the inner sides of the terminal portions 11 of the spring members 10, and are likewise imbedded in the body member 9; the bolt shanks 13 extending outwardly through said terminal portions 11 to project exteriorly from the top and bottom sides of said body member 9. In other words the rubber material of which the resilient body member 9 is composed is molded around the spring members 10 and the portions of the headed bolts engaged with the latter.

As shown in Figure 2 the spring members 10 may be made in the form of single inwardly curved formation; or, if desired, they may be shaped to provide formations including reverse curved portions as shown at 10' in Figure 4. It will be understood, that said spring members may be produced in other forms, and that I do not necessarily confine this invention to springs of the shapes shown and described.

In applying the novel coupling connection in operative relation between a vehicle spring and frame, the same is interposed between the tongue 7 of the frame 5 and the bearing plate 8 of the main leaf of the spring 6, said parts having suitably disposed openings or perforations through which the free ends of the bolt shanks 13 may extend, so that the latter project from the exterior sides of said respective frame tongue 7 and spring bearing plate 8. The free end portions of said bolt shanks 13 are threaded to receive fastening nuts 14, which with suitable lock washers 15, are engaged therewith and screwed home to mechanically assemble and secure the parts in operative relation.

From the above description and an inspection of the drawings, it will be clearly evident that my novel resilient coupling connection provides a yieldable tie between the vehicle frame and leaf-spring, which while yielding adequately to the play of the spring during its flexing movements, nevertheless also, due to the resiliency inherent therein, tends to absorb the shocks and stresses consequent upon the spring action, thus greatly diminishing, if not substantially eliminating, the transmission of such shocks and stresses to the vehicle frame and vehicle body. In my novel construction, the main body of resilient material 9 acts as a buffer or shock-absorber, while the spring members 10 imbedded therein provide an adequate and positive mechanical connection or intercoupling link between the vehicle frame and leaf-spring which retains the main body 9 in operative assembled position, while nevertheless being of such nature as to offer no obstacle to the desired elastic reactions of the latter in operation. In my novel arrangement and association of said spring members 10 with the resilient main body 9, attention is directed to the fact that the former, in the direction of their widths, are disposed transversely within the latter; this coupled with the fact that the ends of said springs are positively anchored respectively to the vehicle frame and leaf-spring, produces an arrangement whereby the springs, while adequately yieldable to stresses both in vertical plane and in horizontal plane, nevertheless resist undue lateral stresses or tendency to side sway, all of which is of considerable advantage, especially in connection with automotive vehicles.

While I have shown and described two of the spring members 10 embedded in the main body 9, and while I deem such arrangement the other hand the number of such springs may be increased, especially when the coupling connection is employed on comparatively large vehicles.

It will also be understood, that while I have described my invention as especially adapted for use as a resilient coupling connection between a vehicle spring and frame, it may be arranged and utilized in other connections wherein its resilient qualities are desirable; e. g. it may be used as a resilient mounting connection between an automobile engine block and chassis frame, or in other similar connections wherein it is desirable to utilize its resilient qualities by interposing the same between opposed parts of a desired structure; all of which I desire to be deemed within the scope of this invention.

As shown in Figure 5 the S-shaped metal spring 16 is embodied in the rubber block 17 and carries the outwardly projecting bolts 18, 18 and 19, 19 which extend beyond said block 17 and through holes in the members 20 and 21 respectively where they are secured in place by nuts or the like. Said members 20 and 21 can be respectively an engine block and a supporting frame, and they both can be leaf spring elements.

Having thus described my invention, I claim:—

1. In combination with a spring and frame of a vehicle, a resilient coupling connection intermediate an end of the spring and the frame, comprising a main body of resilient material, a leaf spring imbedded within said main body to extend between the top and lower portions of the latter, and mechanical fastening means engaged between the terminal portions of said imbedded spring means and said vehicle spring and frame respectively.

2. In combination with a spring and frame of a vehicle, a resilient coupling connection intermediate an end of the spring and the frame, comprising a main body of soft rubber, curved metallic flat spring means imbedded within said main body to extend between the top and bottom portions of the latter, said spring means in the direction of width being disposed transversely of said main body, and mechanical fastening means engaged between the terminal portions of said spring means and said vehicle spring and frame respectively.

3. In combination with a spring and frame of a vehicle, a resilient coupling connection intermediate an end of the spring and the frame, comprising a main body of soft rubber, curved metallic flat spring means imbedded within said main body to extend between the top and bottom sides of the latter, said spring means in the direction of width being disposed transversely of said main shanks projecting exteriorly from said main body, said shanks being engaged through said vehicle spring and frame respectively, and fastening nuts on said bolt shanks for securing the parts in operative assembled relation.

4. In combination with a spring and frame of a vehicle, a resilient coupling connection intermediate an end of the spring and the frame, comprising a main body of soft rubber, a plurality of longitudinally spaced apart curved metallic flat spring members imbedded within said main body to extend between the top and bottom sides of the latter, said spring members in the direction of their width being disposed transversely of said main body, said spring members having terminal portions substantially parallel to the top and bottom planes of said main body, fastening bolts passing outwardly through said terminal portions of said spring members having their heads abutting the inner sides of the latter and also imbedded in said main body and their shanks projecting exteriorly thereof, said bolt shanks extending through said vehicle end and frame respectively, and fastening nuts on said bolt shanks for securing the parts in operative assembled relation.

5. A resilient coupling connection for use between a vehicle spring and frame, comprising a main body of soft rubber having metallic spring means imbedded therein to extend between the top and lower portions thereof, and exteriorly projecting attachment means secured to the terminal portions of said imbedded spring means.

6. A resilient coupling connection for use between a vehicle spring and frame, comprising a main body of soft rubber, a plurality of longitudinally spaced apart curved metallic flat spring members imbedded within said main body to extend between the top and bottom thereof, said spring members having terminal portions flush with the top and bottom sides of said main body, and exteriorly projecting attachment means secured to said terminal portions of said imbedded spring members.

In testimony, that I claim the invention set forth above I have hereunto set my hand this 7th day of October, 1926.

RALPH L. HENRY.